United States Patent [19]

Nishimura et al.

[11] Patent Number: 4,572,928

[45] Date of Patent: Feb. 25, 1986

[54] KEY TELEPHONE SYSTEM

[75] Inventors: Tomio Nishimura, Chiba; Junzo Kikuchi, Kanagawa; Ryuzo Sugiura, Tokyo; Toshiro Yoshida, Kanagawa, all of Japan

[73] Assignee: Tamura Electric Works, Ltd., Tokyo, Japan

[21] Appl. No.: 550,236

[22] Filed: Nov. 8, 1983

[30] Foreign Application Priority Data

Nov. 9, 1982 [JP] Japan .............................. 57-196527
Nov. 19, 1982 [JP] Japan .............................. 57-201987

[51] Int. Cl.⁴ .......................................... H04Q 5/18
[52] U.S. Cl. ................................ 179/99 A; 179/99 R
[58] Field of Search ............... 179/99 R, 99 A, 81 R, 179/18 FA, 99 H, 18 AD

[56] References Cited

U.S. PATENT DOCUMENTS

| | | | |
|---|---|---|---|
| 3,920,902 | 11/1975 | Matsuo et al. | 179/99 |
| 4,081,615 | 3/1978 | Hoehn | 179/18 FA |
| 4,088,844 | 5/1978 | Kinnaird | 179/99 |
| 4,133,985 | 1/1979 | Rasmussen et al. | 179/99 |
| 4,196,316 | 4/1980 | McEowen et al. | 179/18 ES |
| 4,327,256 | 4/1982 | Crooks et al. | 179/99 R |

Primary Examiner—Gene Z. Rubinson
Assistant Examiner—Elio Di Vito
Attorney, Agent, or Firm—Blakely Sokoloff Taylor & Zafman

[57] ABSTRACT

In a key telephone system with a plurality of four-wire key telephone sets wherein a two-wire telephone set is connected to a main control device via a pair of speech lines so that intercom speech and office line speech are possible between the two-wire telephone set and other key telephone sets, the improvement wherein said main control device comprises a call signal generating circuit, first transfer switching means for transfer-connecting said speech lines between a pair of office speech lines and a pair of intercom speech lines, second transfer switching means for transfer-connecting said speech lines between said call signal generating circuit and said first transfer switching means, DC loop supervisory means for supervising a DC loop of said speech lines, and a control circuit inputted with an output of said DC loop supervisory means for controlling said first and second transfer switching means in accordance with the states of said office lines. Under a normal state the speech lines are connected to the intercom speech lines through the first and second transfer switching means. At the time of arrival of an office line call signal the second transfer switching means is switched to send the call signal to the speech lines. Thereafter the second transfer switching means is reset and the first transfer switching means is switched to the office line speech lines in accordance with the output of the loop supervisory means.

14 Claims, 8 Drawing Figures

KEY TELEPHONE SYSTEM

BACKGROUND OF THE INVENTION

This invention relates to a key telephone system, and more particularly a key telephone system wherein a standard telephone set is connected to a main control device through a pair of speech lines and is used as an office line or intercom with other key telephone sets. In the conventional key telephone systems, as the control transmission line for transmitting and receiving control signals becomes long, distributed capacitance results in attenuation of the data and delay of the data. Consequently, it it difficult to install a conventional key telephone set at a position remote from the main control device.

Efforts have been made to design a key telephone system comprising a combination of standard telephone sets which requires only a pair of speech lines and does not also require control lines.

To solve these problems, a system recently has been proposed in which a transfer switch is provided in an interface circuit. For example, when a standard telephone set is used for intercom speech, the standard telephone set is connected to a terminal in the main control device via one contact of the transfer switch and is connected directly to the office lines through the other contact of the transfer switch.

With such a connection, however, when an office line incoming call signal arrives it is necessary for the key telephone set to respond and transfer the signal. To transfer the signal, the user of a standard telephone must manually operate a transfer switch so as to impart a call signal to the main telephone set. When transferring the signal, intercom speech between a key telephone set and a standard telephone set becomes impossible. With a prior art key telephone system, therefore, manual operations were necessary for sending and receiving office line call signals.

In addition to a key telephone set used in a key telephone system, it is usual to accomodate a standard telephone set located at a relatively remote position which is used as a slave telephone set. The main control device is connected to the standard telephone set through a pair of connecting lines. A circuit including the connecting lines is usually connected to an intercom speech circuit by a selection circuit in the main control device. When a handset of the standard telephone set is off-hook, however, the slave telephone set could not be used because the intercom speech circuit would be monopolized.

To add other telephone sets to the key telephone system, additional substrates are used. In a telephone system of this type the substrates have been identified by a manually operated dip switch or by using an identification signal exclusively used for identifying the substrates. The dip switch not only increases the number of component parts but also may result in an erroneous setting. Where the identification signal is used to determine whether the substrate is used to add another key telephone set or a standard telephone set, it is necessary to install additional input and output lines for transmitting the identification signal.

When it is desired to install a key telephone set at a position remote from the main control device, attenuation of data results from line length and delay of the data results from distributed capacitance of the long line. Therefore, it is impossible to use a simple data transmission system. Instead, it is necessary to install a two wire standard telephone set utilizing a pair of speech lines and control circuits in and outside of the main control device, thus complicating the construction and increasing the cost of installation.

In a key telephone system wherein a call signal is sent to a telephone set through speech lines, a stored program system utilizing a contact of a loop supervisory relay has been used to stop sending out the call signal. A stored program system stores necessary processing procedures in a memory device according to a predetermined sequence. With this stored program system, howver, the stop of the call signal lags the hooking off of the handset by about 100 ms, including the operating time of the relay contact, a poling time and a timer operating time necessary for preventing erroneous operation due to chattering of the relay contact.

SUMMARY OF THE INVENTION

Accordingly, it is an object of this invention to provide an improved key telephone system which can operate in the same manner as a conventional key telephone set providing the conventional key telephone system functions of office line origination, office line signal reception, intercom origination, and intercom signal reception.

Another object of this invention is to provide a key telephone system in which connecting lines are transfer connected from a selection circuit to a busy tone generator when a request from a hooked off standard telephone set is not accepted and when a request from the hooked off standard telephone set does not occur for a definite time so as to prevent exclusive occupation of the intercom speech circuit caused by an off-hook handset.

Still another object of this invention is to provide an improved key telephone system wherein a loop supervisory signal is periodically sent out as an identification signal so as to effect an automatic identification of a two-wire substrate, to eliminate defective manual settings, and to eliminate the identification signal line.

A further object of this invention is to provide a key telephone system capable of utilizing a single local line for either a four wire key telephone set or a two wire standard telephone set thus saving the use of additional local lines.

Another object of this invention is to provide an improved key telephone system in which a photocoupler is connected in a DC loop established at the time of sending out a call signal so as to automatically stop the operation of a call signal generator prior to the stop of operation of the supervisory relay included in the speech circuit.

According to this invention, there is provided a key telephone system with a plurality of four-wire key telephone sets wherein a two-wire telephone set is connected to a main control device via a pair of speech lines so that intercom speech and office line speech are possible between the two-wire telephone set and other key telephone sets, and wherein the main control device comprises a call signal generating circuit, first transfer switching means for transfer-connecting the speech lines between a pair of office speech lines and a pair of intercom speech lines, second transfer switching means for transfer-connecting the speech lines between the call signal generating circuit and the first transfer switching means, DC loop supervisory means for supervising a DC loop of the speech lines, and a control circuit inputted with an output of the DC loop supervisory means for controlling the first and second transfer switching means in accordance with the states of the office lines, whereby, under a normal state, the speech lines are connected to the intercom speech lines through the first and second transfer switching means, and at the time of arrival of an office line call signal the second transfer switching means is switched to send the call signal to the speech lines, thereafter the second transfer switching means is reset and the first transfer switching means is switched to the side of the office speech lines in accordance with the output of the loop supervisory means.

According to one embodiment of this invention, there is provided a key telephone system comprising a main control device including a two-wire telephone set connected to the main control device through a pair of speech lines, and normally connected to a pair of intercom speech lines first transfer-switching means, a busy tone generator, second transfer switching means for disconnecting the speech lines from the first transfer-switching means and then connecting the speech lines to the busy tone generator, and a control unit for controlling the first and second transfer switching means when a request from the off-hook two-wire telephone set is not accepted and when a request from the two-wire telephone set is not made for a definite interval.

DESCRIPTION OF THE PREFERRED EMBODIMENT

Figure 1:
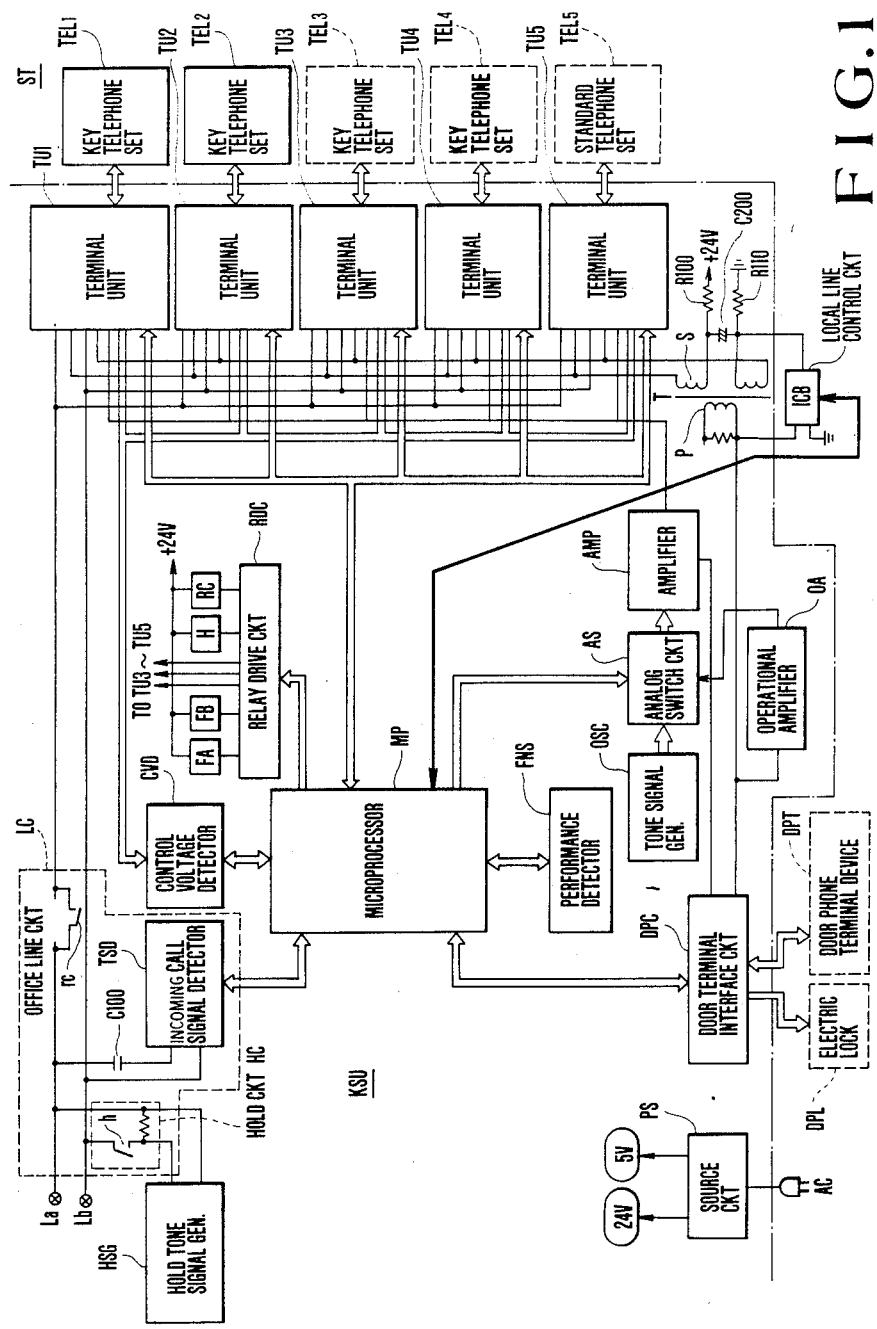
FIG. 1 is a block diagram showing the basic construction of one embodiment of a key telephone system according to this invention

Referring now to FIG. 1, reference character KSU designates a main control device or key service unit and ST indicates the terminal side of individual standard telephone sets.

La and Lb designate office line terminals connected to office lines, AC designates a source of commercial frequency and PS converts AC 240 V into DC 24 V and DC 5 V, for example. An incoming or arriving call signal detector TSD is connected across office line terminals La and Lb via a capacitor C 100 for detecting a call signal arriving at the office line terminals La and Lb and constitutes a portion of an office line circuit LC. FA and FB show relays for transfer-connecting the terminal device between an office line speech circuit and an intercom line speech circuit, these relays having contacts fa1, fa2, fb1 and fb2 for the transfer connection as will be described later in FIG. 2. H designates a relay having a contact h for preserving office lines, and RC designates a relay which operates for about 500 ms, for example, when the origination is made again, the relay RC having a contact rc connected between the office line terminal La and terminal units TU1 through TU5.

Still referring to FIG. 1, a relay drive circuit RDC is provided for driving relays FA, FB, H and RC in accordance with a control signal from a microprocessor MP. The relay drive circuit is connected to terminal units TU3 through TU5 for driving F relays contained therein. Where the terminal units are fixed, the F relays FA and FB are connected on the side of the main control device, whereas when additional terminal units TU3 through TU5 are installed additional F relays are mounted on an additional substrate to be incorporated into the terminal unit. A hold tone signal generator HSG is connected across the office line terminals La and Lb via hold contact h.

Still referring to FIG. 1, a resistor r connected between a switch h and the hold signal generator HSG constitutes a hold circuit HC. This hold circuit HC, a capacitor C100, a contact rc and a incoming call signal arrival detector TSD constitute an office line circuit LC.

Still referring to FIG. 1, local line control circuit ICB exchanges individual call signals between a doorphone terminal device DPT and the microprocessor MP. A door terminal interface circuit unit DPC exchange door phone informations between the doorphone terminal device DPT and a microprocessor MP. The door terminal interface unit DPC not only exchange door phone informations between device DPT and a door phone terminal device DPT but also sends a control signal to an electric lock DPL for controlling the same.

Still referring to FIG. 1, a performance detector FNS sets various performances necessary between the key telephone system and the microprocessor MP. Also provided is a tone signal generator OSC comprising a call tone generator CTG shown in FIG. 2 and an alarm tone generator ATG also shown in FIG. 2. An analog switch circuit AS is inputted with the output of the tone signal generator OSC and the output of an operational amplifier OA and is ON/OFF controlled by control signals from the microprocessor MP. An amplifier AMP amplifies the output of the switch circuit AS and the output of this amplifier AMP is sent to terminal units TU1 to TU5. A transformer T is connected to the terminal units TU1 to TU5 and to the door terminal interface circuit DPC and the intercom line control circuit ICB. This transformer T constitutes an intercom speech current supply source together with resistors R100, R110 and capacitor C200 connected across its secondary winding S. The primary winding P of this transformer T is connected to an input of an operational amplifier OA. A control voltage detector CVD exchanges necessary control informations between terminal units TU1 to TU5 and the microprocessor MP and operates to detect a control voltage from the terminal units TU1 to TU5. As is well known in the art, the microprocessor MP comprises a control circuit CPU, a decoder, a fixed memory device (ROM), and a temporary memory device (RAM). In this embodiment the microprocessor MP is connected through a bus line to an incoming signal detector TSD of the office circuit LC, a control voltage detector CVD, the relay drive circuit RDC, a performance detector FNS, a switch circuit AS, an intercom line control circuit ICB, and the door terminal interface circuit DPC. Furthermore, the microprocessor MP sends out control signals that light lamps of each telephone set and operate amplifiers contained in a control circuit in a telephone circuit, via the bus line and a terminal unit.

Four wire key telephone sets (hereinafter merely called key telephone sets) exchange control signals and voice communication. Terminal units TU1 and TU2 shown by solid lines are fixed telephone sets, while terminal units TU3 and TU4 shown by dotted lines and key telephone sets TEL3 and TEL4 are to be installed later. Like the terminal units TU3 and TU4 and telephone sets TEL3 and TEL4, the terminal unit TU5 and the key telephone set TEL5 are to be installed later. In this embodiment, however, the terminal unit TU5 and the key telephone set TEL5 can be made to be either a four wire type similar to the units described above or a two wire type. In the following description, the terminal unit TU5 and the telephone set TEL5 are the two wire type. The standard telephone set TEL5 is installed at a position remote from the main control device. It should be noted that each of the terminal units TU3 to TU5 is to be added in future, so that parts constituting an interface circuit on one substrate are mounted as a terminal unit.

Figure 2:
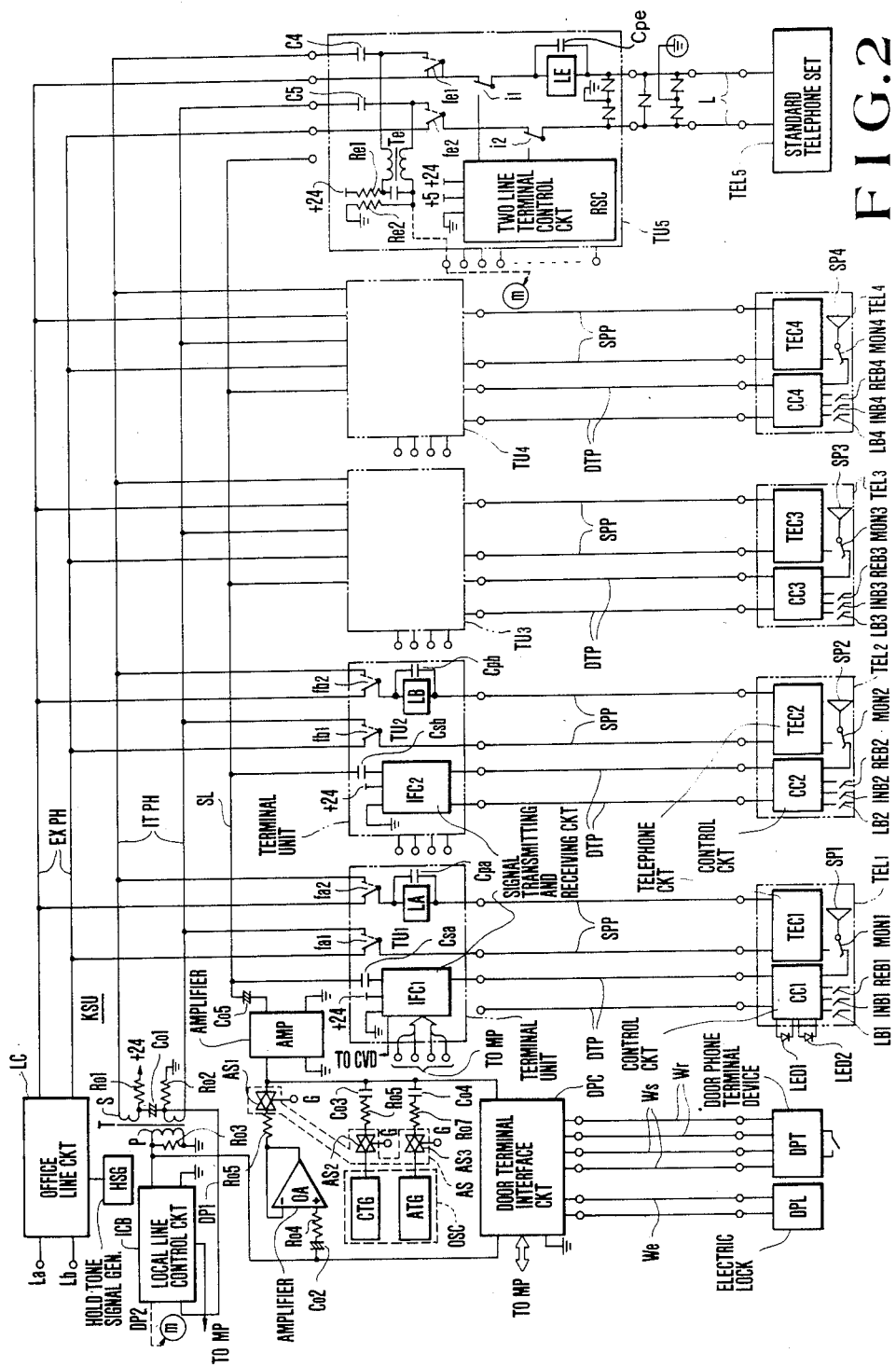
FIG. 2 is a block diagram showing the relation between a terminal unit utilizing a standard telephone set and the microprocessor shown in FIG. 1.

FIG. 2 is a block diagram showing the detail of FIG. 1 in which the microprocessor MP is not shown and the mutual relation between the signal circuits and speech circuits, and various elements of the telephone system are shown.

In FIG. 2, elements corresponding to those shown in FIG. 1 are designated by the same reference characters. Thus TEL1 to TEL4 are four wire key telephone sets and TEL5 is a two wire standard telephone set. The standard telephone set TEL5 is connected to the main control device KSU via a pair of speech lines L so that the standard telephone set TEL5 can make intercom speech and office line speech with other key telephone sets TEL1 to TEL4.

As above described, the office line circuit LC is connected to the office lines via office line terminals La and Lb and to to office line speech circuits EX PH. The office line circuit LC further comprises incoming call signal detection circuit TSD shown in FIG. 1, an arrester, not shown, and is constructed to be connected with a hold tone signal generator HSG also shown in FIG. 1. Now referring to FIG. 2, the office line speech circuit EX PH connected to the office line circuit LC is connected to the standard telephone set TEL5 through contacts fe1 and fe2 of the relay FE of the terminal unit TU5 shown in FIG. 3 and contact i1 and i2 of a relay I and relay LE shown in FIG. 3, and to the key telephone sets TEL1 to TEL4 via terminal units TU1 to TU4.

Referring to FIG. 2, the intercom line control circuit ICB acts to detect dial pulses or two frequency dial signals in order to send out call tones, and is connected to the intercom line speech circuit via the transformer T. The intercom speech circuit IT PH is connected to the standard telephone set TEL5 via serially connected capacitor C4, relay contacts fe1 and i1 and relay LE, and serially connected relay contacts fe2 and i2. Furthermore, the intercom line control circuit is connected to the key telephone sets TEL1 to TEL4 via key telephone sets TU1 to TU4 respectively. An amplifier OA applies the output of the intercom line control circuit ICB to a noninverting input terminal (+) via serially connected capacitor CO2 and a resistor R04. The output of the amplifier OA is connected to the inverting input (−) and to the amplifier AMP via resistor R05 and a switch AS1 of an analog switch AS connected in series. A signal line SL connected to the amplifier AMP via a capacitor C05 is connected to the key telephone sets TEL1 to TEL4 respectively through terminal units TU1 to TU4.

Still referring to FIG. 2, the oscillator OSC is constituted by a call signal generator CTG and an alarm signal generator ATG. The call signal generator CTG generates a call signal when office line and intercom line call signals arrive, and the call signals have a frequency of 500/600 Hz modulated by 16 Hz. The alarm signal generator ATG of the oscillator OSC generates an alarm signal having a frequency of 600 Hz which gives an alarm to a subscriber when an off-hook time exceeds a predetermined length. The outputs of the call signal generator CTG and the alarm signal generator ATG are respectively sent to switches AS2 and AS3 of an analog switch AS. These switches are ON/OFF-controlled by a control signal sent from the microprocessor MP shown in FIG. 1. The outputs of switches AS2 and AS3 are applied to the input of an amplier AMP respectively through a resistor R05 and a capacitor C03, and through a resistor R07 and a capacitor C04, as shown in FIG. 2.

Still referring to FIG. 2, a door terminal interface circuit DPC is supplied with a call key signal from a door phone terminal device DPT via speech transmission wire WS. The call signal output from the door terminal interface circuit DPT is sent to respective key telephone sets TEL1 to TEL4 through respective information circuits including the amplifier AMP, capacitor C05, signal line SL and terminal units TU1 to TU4 to be produced by respective key telephone sets as call signals.

Still referring to FIG. 2, the electric lock DPL is installed at the inlet door and connected to the terminal interface circuit DPC through control wires We. A resident or a visitor is confirmed by talking with a door terminal device DPT connected with the terminal interface circuit DPC through transmission lines Ws and receiving lines Wr. The electric lock DPL is temporarily unlocked by dialling "7", for example, of one of the four line telephone sets TEL1 to TEL4 which is communicating with the door phone terminal device DPT.

As shown in FIG. 2, each of the terminal units TU1 to TU4 comprise a signal transmitting and receiving circuit IFC1 to IFC4, a capacitor Csa ato Csd, a loop supervisory relay LA to LD, a capacitor Cpa to Cpd, and contacts fa1 and fa2 through fd1 and fd2 of an office line/intercom line transfer relay. The signal transmitting and receiving circuits IFC1 to IFC4 exchange control signals with the microprocessor MP. Circuits IFC1 to IFC4 are connected to the amplifier AMP via capacitor CO5, and capacitors Csa to Csd for sending an AC signal on the signal line SL via information circuit DTP and control circuits CC1 to CC4 to speakers SP1 to SP4. Respective terminal units send to the microprocessor MP signals relating to control signals given from the telephone sets TEL1 to TEL4 via information circuit DTP and control circuits CC1 to CC4. Relays LA to LE in respective terminal units TU1 to TU5 are inserted in the speech loops for supervising the same and operate when DC loops are formed when the telephone sets are hooked off. These relays are connected in parallel with decoders Cpa through Cpe respectively which prevent resetting of the relays LA to LE due to dial pulses or hook-on. Contacts la through le shown in FIGS. 3 and 4 and the relays LA to LE, shown in FIG. 2, are connected to apply hook information to the microprocessor MP. Contacts fa1 and fa2 through fd1 and fd2 in the terminal units TU1 to TU4 are contacts of relays FA to FD, shown in FIG. 1, for connecting respective terminal units to the office line speech circuit or the intercom line speech circuit. When the movable contacts are thrown to dotted line positions, corresponding terminal units are connected to the intercom speech circuit IT PH. While in the solid line position corresponding terminal units are connected to the office line speech circuit EX PH. Under a normal condition the movable contacts are held in the dotted line position. When the key telephone set TEL2 is off-hooked to send a call signal to the office lines and when a line key LB2 is depressed, the call signal is sent to the microprocessor MP via the control circuit CC2 of the key telephone set TEL2, and the signal transmitting and receiving unit IFC2. Then the microprocessor MP resets the relay FB through a relay drive circuit RDC to throw movable contats fb1 and fb2 to the solid line positions to connect the key telephone set TEL2 to the office line speech circuit EX PH. In the on-hook position or the hold operation of the key telephone set TEL2, the relay FB is reenergized to throw movable contacts fb1 and fb2 to the intercom speech circuit or dotted line positions.

Still referring to FIG. 2, the key telephone sets TEL1 to TEL4 are provided with control circuits CC1 to CC4 connected to information circuits DTP, telephone circuits TEC1 to TEC4 connected to the speech circuits SPP, monitor keys MON1 to MON4, and loudspeakers SP1 to SP4.

Still referring to FIG. 2, these key telephone sets TEL1 to TEL4 are respectively provided with office line display lamps and monitor display lamps LED1 to LED8, intercom line keys INB1 to INB4, and remote keys REB1 to REB4, and remote keys REB1 to REB4. The monitor display lamp is lighted when the monitor key MON is transferred to the side of a telephone circuit. The monitor key MON is normally connected to the control circuit and is used to produce an office line call tone, an alarm tone, etc. when a simultaneous or individual AMP ON signal is received from an other telephone set.

Figure 3:
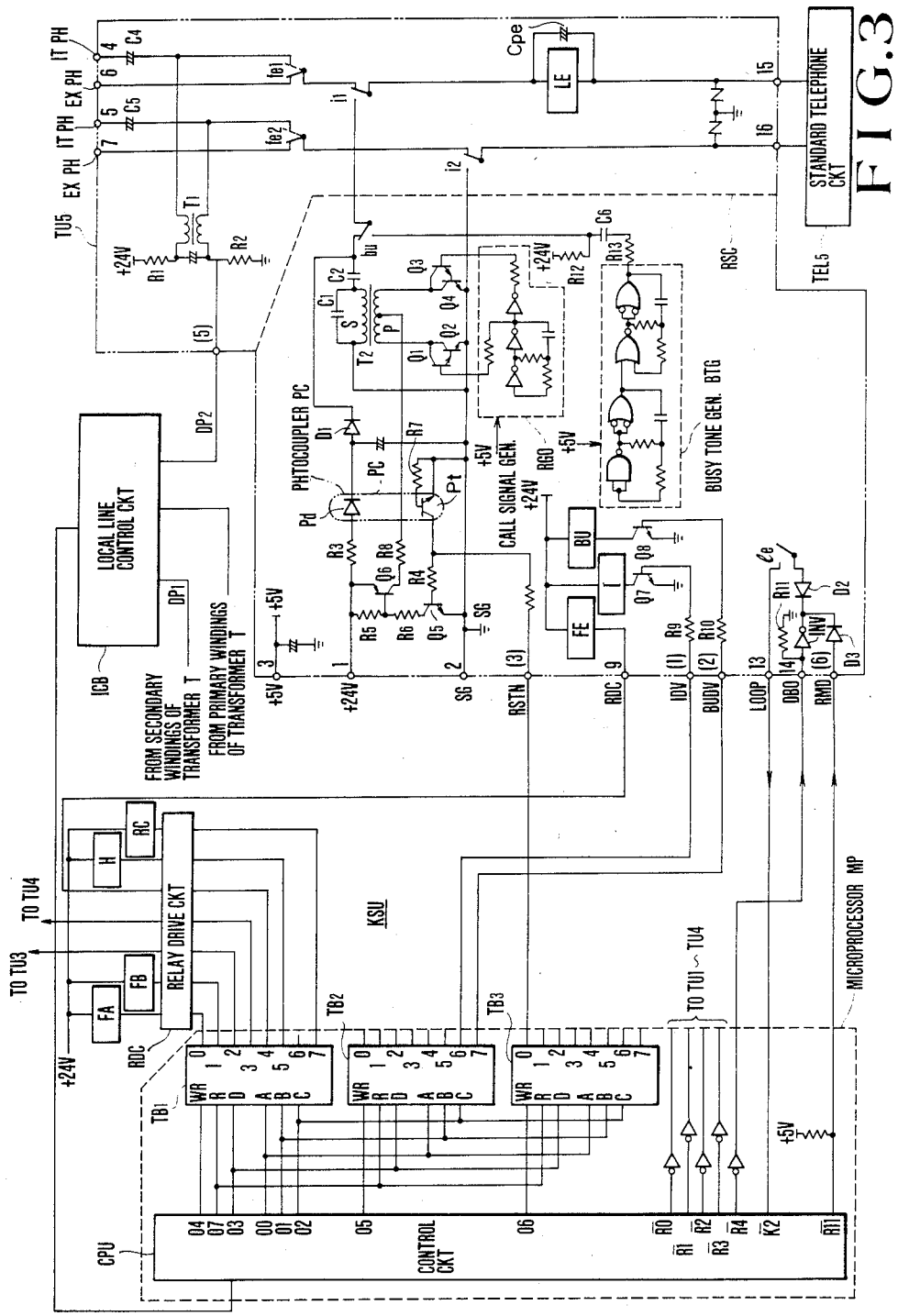
FIG. 3 is a block diagram showing the detail of a preferred embodiment of this invention.

Referring now to FIG. 3, the terminal unit TU5 is related to the two wire standard telephone set TEL5 and is constructed as a plug-in type with elements mounted on a single substrate. The terminal unit TU5 comprises a relay FE, and a terminal control unit RSC which transfer connects terminal control circuit RSC and the terminal unit to the office line speech circuit EX PH or intercom speech circuit IT PH. The contacts fe1 and fe2 of the relay FE and contacts i1 and i2 of a relay I are operated when a call signal and a busy tone signal are sent to the standard telephone set TEL5.

Thus the interface circuits of the terminal units TU1 to TU5 are provided between various circuits described above, and between the four wire key telephone sets TEL1 to TEL4 and the two wire standard telephone set TEL5. Terminal units TU3, TU4 and TU5 are to be installed later. In the embodiment shown in FIG. 2, although the terminal unit TU5 is actually provided with a standard telephone set, a four wire key telephone set or two wire standard telephone set may be provided at the position of the terminal unit TU5.

Still referring to FIG. 2, respective terminal units TU1 to TU4 and four wire key telephone sets TEL1 to TEL4 are interconnected by a speech circuit SPP and an information circuit DTP.

Still referring to FIG. 2, the office lines connected to a telephone exchange are connected to the office line speech circuit EX PH via office line terminals La and Lb and the office line circuit LC. Referring now to FIG. 1, the office line circuit LC includes the hold circuit HC for holding the office lines. Referring now to FIG. 2, an intercom voice circuit IT PH supplies speech current to the four wire key telephone sets TEL1 to TEL4 and the two wire standard telephone set TEL5 via the secondary winding S of transformer T and resistors R01 and R02.

Still referring to FIG. 2, the intercom line control circuit ICB is connected across the primary winding P of the transformer T. If necessary, the intercom line control circuit ICB sends a call back signal to respective four wire key telephone sets TEL1 to TEL4 and two wire standard telephone set TEL5 through an intercom speech circuit IT PH. Between one end of the primary winding P of the transformer T and the switch circuit AS is connected an operational amplifier OA via a capacitor C02 and a resistor R04. The output of the operational amplifier OA is supplied to the signal line SL via a switch AS1 of the analog switch circuit AS which is turned on by a "H" signal from the microprocessor MP, amplifier AMP and capacitor C05, while control signals and voice signals are supplied to the signal transmitting and receiving circuits IFC1 to IFC4 of the terminal units TU1 to TU4 at the time of a simultaneous or individual call. The outputs of the circuits IFC1 to IFC4 are produced by respective loudspeakers SP1 to SP4 via information circuits DTP and control circuits CC1 to CC4 of the four wire key telephone sets TEL1 to TEL4.

The operation of the embodiment shown in FIG. 2 is as follows. When the standard telephone set TEL5 and the key telephone sets TEL1 to TEL4 exchange speech, the hand set is hooked off. When the called party responds, speech current is supplied to the intercom speech circuit IT PH.

At the time of a simultaneous call, for example, when TEL2 is hooked off and intercom line button INB2 is depressed, the speech current is supplied to the loud speakers of respective key telephone sets TEL1 to TEL4 from the telephone circuit TEC2 of the key telephone set TEL2 via the speech circuit SPP, intercom speech circuit IT PH, the primary winding P of transformer T, capacitor C03 resistor R04, operational amplifier OA, amplifier AMP, signal line SL, and terminal units TU1 to TU4.

Since the primary winding P of transformer T is connected to the terminal of the speech circuit of the door terminal interface circuit DPC, it is possible to exchange speech between the door phone terminal device DPT and the four wire key telephone set through transformer T and the intercom speech circuit IT PH. The call signal from the door phone terminal device DPT is sent to four wire key telephone sets TEL1 to TEL4 from the output terminal of the terminal interface circuit DPC via amplifier AMP, capacitor C03, signal line SL and information circuit DTP and is produced as tones through loudspeakers SP1 to SP4 at the key telephone sets TEL1 to TEL4.

The call signal from the oscillator OSC is ON/OFF-controlled by the control signal from the microprocessor MP shown in FIG. 1 and applied to the switch AS2 of the analog switch AS shown in FIG. 2. The microprocessor MP identifies the type of the incoming call signal for applying an ON/OFF control signal to the gate circuit G of switch AS2 of the analog switch AS as follows.

In a case when an office line call signal arrives the switch AS2 is ON/OFF-controlled by a timing of 0.4 second ON, 0.2 second OFF, 0.4 second ON, and 0.2 second OFF. In a case of an intercom line call signal arrival, the switch AS2 is controlled by a timing of 1 second ON, two seconds OFF. The incoming call signal formed by such ON/OFF control is applied to respective key telephone sets TEL1 to TEL4 via amplifier AMP, signal line SL, terminal units TU1 to TU4 and respective information lines.

In the case of the standard telephone set TEL2, a call signal having a frequency of an itercom call from about 45 Hz is generated by a call signal generator (not shown) included in the two line terminal control circuit RSC in the terminal unit TU5 and the call signal is amplified to a call signal for a 50 V standard telephone set. This amplified call signal is sent to the two wire standard telephone set TEL5 via the contacts i1 and i2 of relay I for driving the ringer of the telephone set.

When the oscillator OSC generates an alarm signal having a frequency of 600 Hz, the control for the alarm tone and the OFF hook alarm tone is effected by giving a control signal of level H to the gate circuit G of the switch AS3 of the analog switch AS from the microprocessor MP.

These tones are produced by the loudspeakers SP1 to SP4 of respective four wire key telephone sets TEL1 to TEL4, in the same manner as the call signal described above. FIGS. 5, 6, 7 and 8 are flow charts showing the control effected by the microprocessor MP shown in FIG. 1.

Figure 5:
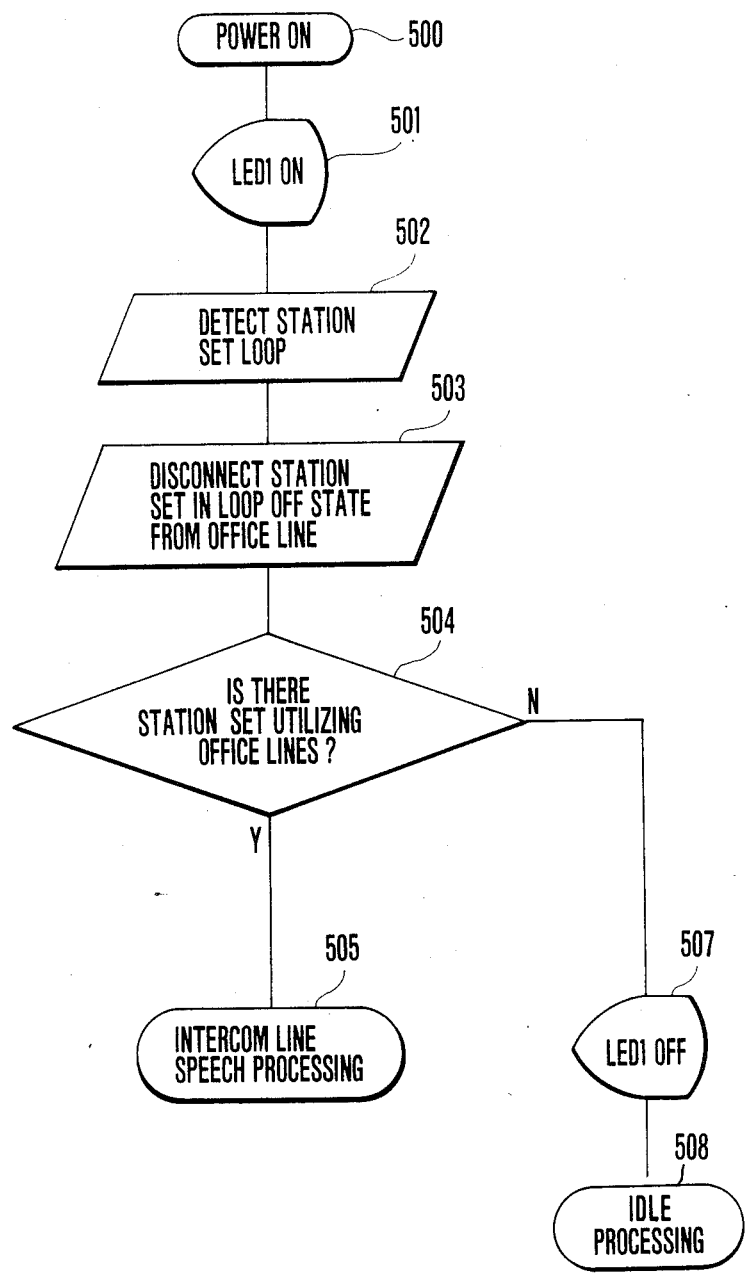
FIGS. 5 through 8 are flow charts showing the states of control effected by the microprocessor utilized in this embodiment.

In FIG. 5, at step 500, (POWER ON) the source circuit PS is energized and at step 501 (LED1 ON) the office line display lamps LED1 to LED4 of the four wire telephone sets TEL1–TEL4 are lighted simultaneously. Then at step 502 a station set LOOP is detected in accordance with the opened or closed states of the contacts la to le for controlling relays FA to FE. At step 503, the relays disconnect the station set from the office lines. Then at step 504 a judgment is made whether there is an operating station set utilizing the office lines or not. When the result of judgment is YES, at step 505, the intercom line speech processing is executed.

When the result of judgment at step 504 is NO because that is when there is an operating station set utilizing the office lines, at step 507 (LED1 OFF) the office line display lamps LED1 to LED4 of the four wire telephone lines TEL1 to TEL4 are turned off and the program is advanced to step 508 designated as IDLE processing.

Figure 6:
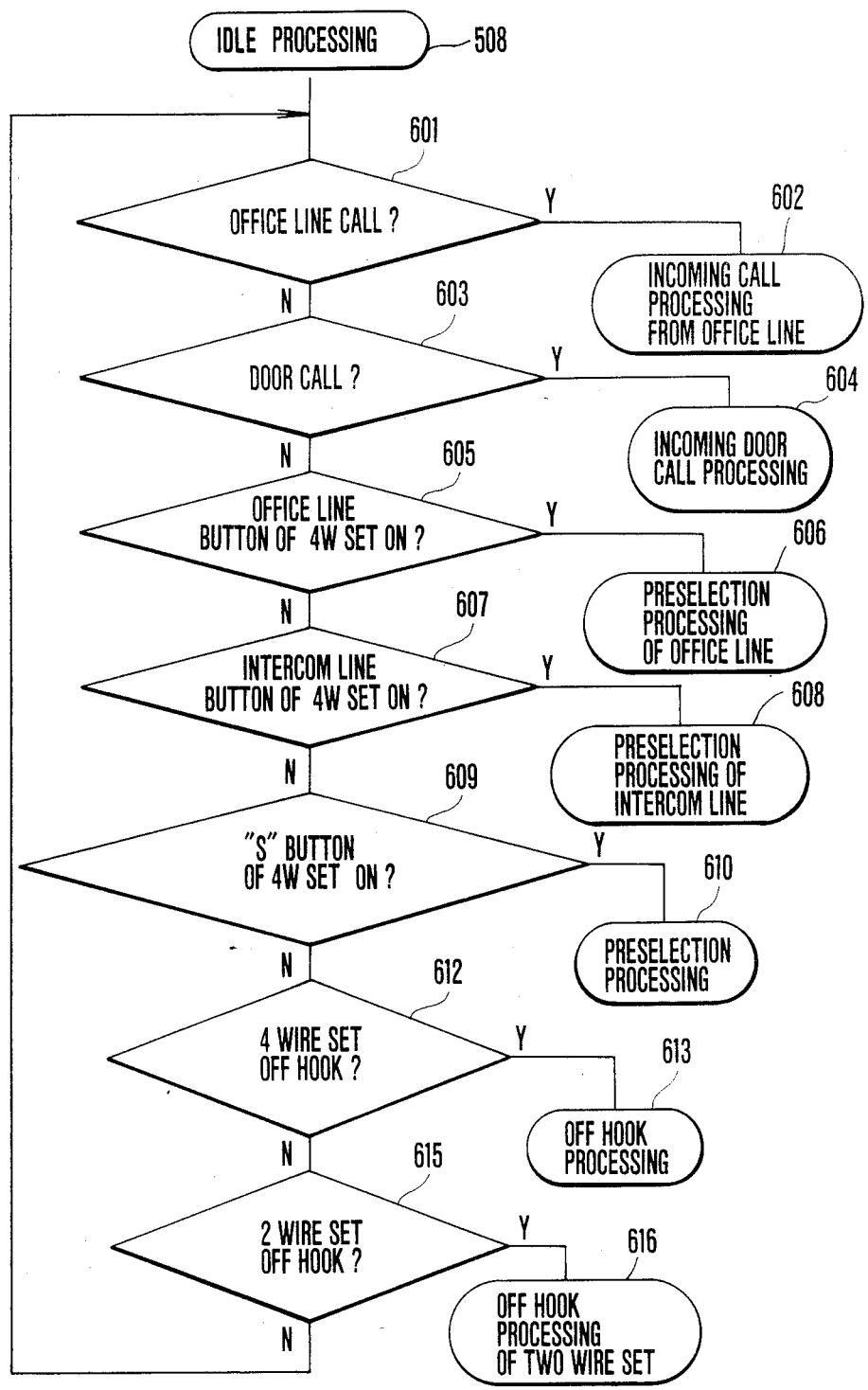

In FIG. 6, at step 601 following step 508 (IDLE processing), a judgment is made whether there is a call signal from the office lines or not. When a call signal from the subscribers lines id detected, at step 602 the call signal is sent to the loudspeakers SP of respective four wire telephone sets TEL1 to TEL4 for execution of the incoming call processing from the office line. When the result at step 601 is NO, at step 603 a judgment is made as to whether there is an arrived door call signal. When the result of this judgment at step 603 is YES, at step 604 a chime signal is sent to the loud speakers SP of the four wire telephone sets TEL1 to TEL4 for executing the incoming door call processing.

When the result of judgment at step 603 is NO, step 605 then determines whether an office line button of the four wire telephone set is depressed or not. If the answer at step 605 is YES, at step 606 a line preselection is made to prepare for speech over office lines EX PH. When the result of judgment at step 605 is NO, step 607 determines whether an intercom line button of the four wire set is on. If the operatin of the intercom line button INB of four wire telephone sets TEL1 to TEL4 is detected the result of step 607 is YES. Then at step 608, preselection processing for speech communication over the intercom circuit IT PH is made. When the result of step 607 is NO step 609 determines whether a remote button REB of the four wire telephone sets is on. If a remote button is set on, at step 610 preselection processing for speech communication over the two wire telephone set TEL5 is made. If the result of the judgment at step 609 is NO, step 612 (4W OFF HOOK) determines whether the OFF HOOK state exists at the four wire telephone sets TEL1 to TEL4. If a hand set is hooked off, and in response to a dial operation, the call signal circuit and the speech lines are closed according to the preselection preparation described above.

When the result of the judgment at step 602 is NO and when the result of step 605 is YES, at which an office line button of the four wire telephone sets is detected, at step 606 a line is preselected utilizing the office line speech circuit EXPH. Then at step 607 a judgment is made as to whether there is an operating four wire telephone set or not. The result at step 607 is YES if the operation of the intercom line button INB of the four wire telephone sets is detected. At step 608, a line is preselected utilizing the intercom line speech circuit IT PH. When the result of the judgment at step 607 is NO, the result of judgment of step 609 is YES if the operation of the remote button REB of the four wire telephone sets is detected. Then at step 610, a line is preselected to prepare for speech of the two wire telephone set TEL5. When the result of judgment at step 609 is NO and the result of judgment at step 612 is YES, the OFF hook state of the four wire telephone sets TEL1 to TEL4 is detected. Then according to the dial operation at step 613 a call tone send out circuit and a speech circuit are established based on the preparations described above corresponding to the dial operation.

When the result of judgment at step 612 is NO, step 615 determines whether the two wire telephone sets are in the OFF hook state. If the judgment at step 615 is YES, the OFF hook state of the two wire telephone set would be detected. The program is then advanced to step 616 at which a remote call is made. If the result or judgment at step 615 is NO, the program is returned to step 601 so as to check whether there is an office call or not.

Figure 7:
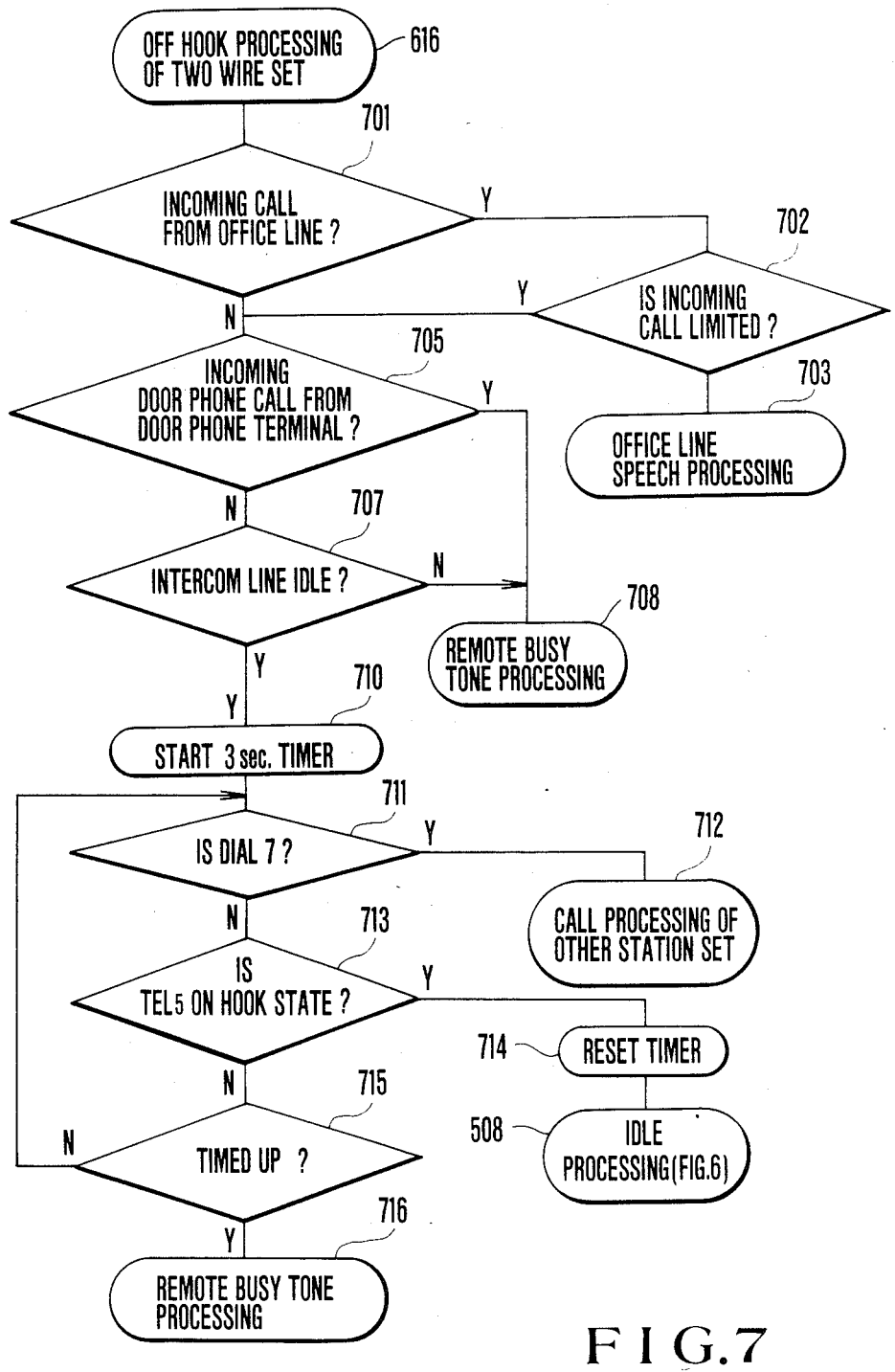

In FIG. 7, in accordance with a remote call executed at step 616, it is determined whether an office line call is arriving, a door phone call is arriving, or an intercom line is IDLE. When the result of judgment at step 701 as to whether the intercom line call is arriving is YES, the program is advaned to step 702 where check is made as to whether call signal control is made or not. When the call signal control is not made, at step 703, an office line speech is processed to permit an office line reply from the two wire telephone set TEL5. When the demand from the two wire telephone set TEL5 can be accepted, the result of judgment at step 701 is NO, that of at step 702 is YES, step 705 determines whether the door phone call signal is arriving. If the judgment of step 705 is NO, that of step 707 is NO, the program is advanced to step 708 to produce a remote busy tone.

When the result of judgment at step 707 as to whether the intercom line is idle or not is YES, at step 710, a 30 second timer installed in the control unit CPU for supervising hooking off of a handset is started. Then at step 711 a check is made as to whether the sent out dial tone from the two wire telephone set TEL5 is 7 or not. When the result of the check at step 711 is YES, at step 712 other station telephone sets are called in accordance with the dialled number. When the result of the check at step 712 is NO, at step 713, the ON hook state of the two wire telephone set TEL5 is supervised. If the result of jugment at step 713 is YES, the 30 second timer is reset at step 714 and the program is returned to step 508 shown in FIG. 8. When the result of judgment at step 715 is YES, that is where the two wire telephone set TEL5 does not make any request for a definite interval (30 seconds in this example) the program is advanced to step 716 where a remote busy tone is issued. The steps following this step 716 are shown in FIG. 8.

Figure 8:
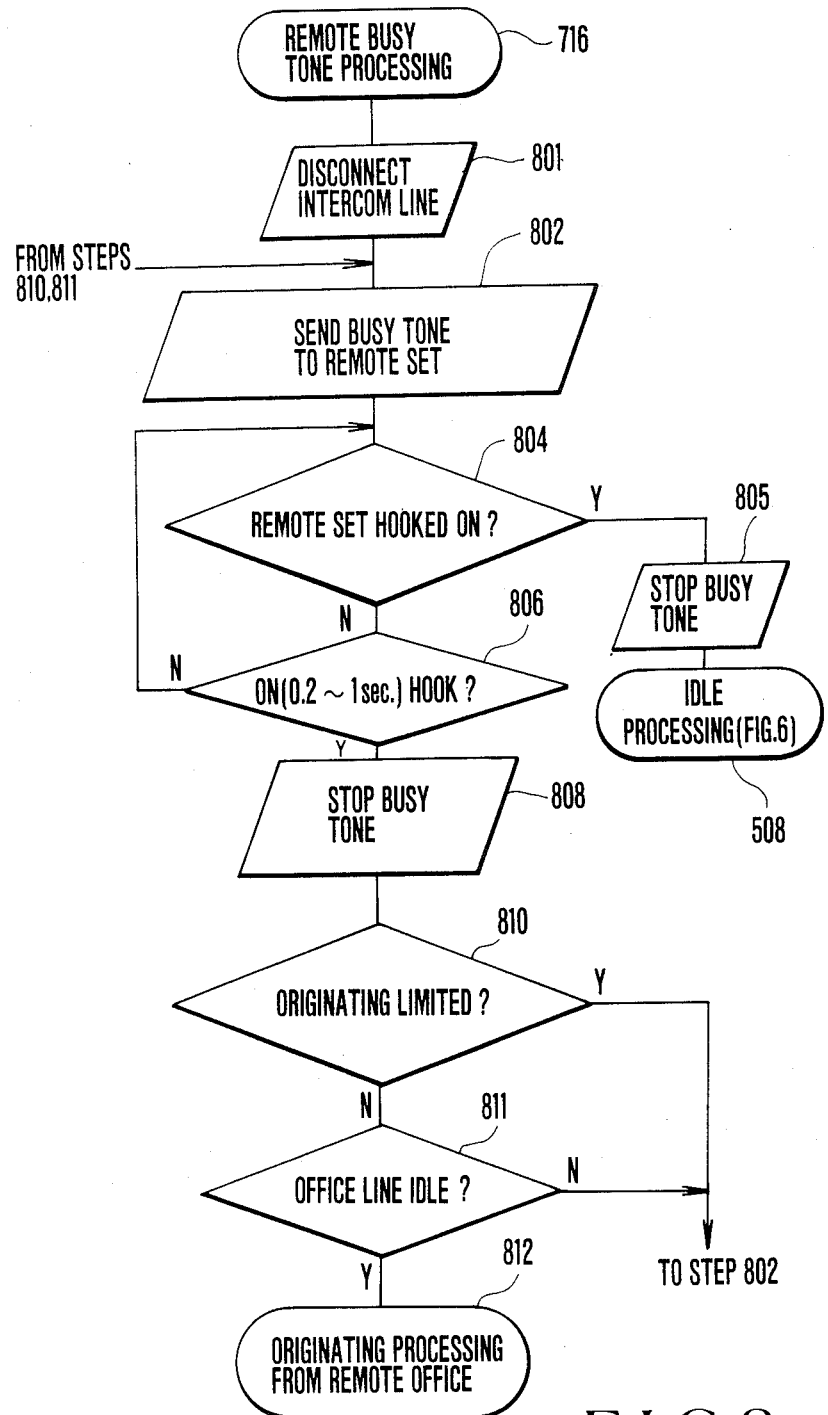

In FIG. 8, in accordance with the state of the remote busy tone produced at step 716, at step 801 the microprocessor MP controls relay I in the two wire terminal control circuit RSC in the terminal unit TU5 to disconnect the connecting wire L from contact fe, thus disconnecting the intercom line. At the same time, the relay I connects the connecting wire L to the control circuit RSC to actuate a busy tone generator BTG (shown in FIG. 3) in the control circuit RSC. Then, at step 802, the busy tone is sent to remote sets. At step 804 a judgment is made as to whether the two wire telephone set TEL5 is in the ON hook state or not when the handset is in the ON hook state the microprocessor MP stops the control of relay I in control circuit RSC as well as the operation of the busy tone generator BSG at step 805. Then the program is returned to the state at step 508 shown in FIG. 6.

Where the result of judgment at step 804 as to whether remote sets are in the ON hook state is NO, and where the result of judgment at step 806 whether the handset is in the ON hook state is YES, at step 808 the control of relay I is stopped and the operation of the busy tone generator BTG is stopped. Then step 810 determines whether originating is limited. If the judgement at step 810 is NO and when the result of judgment at step 811 as to whether the office lines are idle or not is YES, at step 812, a signal is sent to the remote office line, thus permitting signal transmission through the office line speech circuit EX PH. If at step 810, signal transmission is limited or if there are no idle office lines, the program is returned to step 802 without transmitting signals over remote office lines.

Under these conditions, when the handset of the two wire telephone set TEL5 is hooked OFF, the connecting line L is disconnected from the intercom speech circuit IT PH and a busy tone is sent to the two wire telephone set TEL5, thus preventing establishment of the intercom speech circuit caused by the OFF hook set. At such time the intercom speech circuit IT PH can be freely used by the four wire telephone sets TEL1 to TEL4.

However, since the number of accommodated subscribers lines and the number of telephone sets TEL1 to TEL5 may be selected as desired, it should be understood that the flow charts shown in FIGS. 5 to 8 may be changed. More particularly, the order of various steps may be interchanged or unnecessary steps may be omitted.

FIG. 3 is a block diagram showing a more detailed construction of one embodiment according to this invention, and in particular the relation between the two wire standard telephone set TEL5 and the terminal unit TU5. In FIG. 3, circuit elements the same as or corresponding to those shown in FIGS. 1 and 2 are designated by the same reference charactors. Thus, TEL5 designates the two wire standard set, and elements bounded by dot and dash lines show the terminal unit TU5 of the standard telephone set TEL5. These elements are mounted on a single board. In FIG. 3, FE represents a relay for transfer connecting terminal devices to the office line speech circuit EX PH or to the intercom speech circuit IT PH. The relay FE includes contacts fe1 and fe2. BU is a relay for sending a busy tone to the standard telephone set TEL5, the relay having a contact bu. The intercom line control curcuit ICB utilized herein is constructed such that it counts the number of dial pulses DP1 from the terminal units TU1 to TU4 and the number of dial pulses DP2 from the terminal unit TU5 for sending the counted information to the microprocessor MP, particularly the control circuit CPU thereof.

Still referring to FIG. 3, the path of the dial pulse is grounded through a resistor R2 and the secondary winding of a transformer T1, with its primary winding connected to a source terminal of $+24$ V via resistor R1. One end of the primary and secondary windings is connected to the intercom speech circuit IT PH via capacitors C4 and C5 respectively, and to the standard telephone set TEL5 via contacts fe1 and fe2 of relay FE, contacts i1 and i2 of relay I which are connected in series, and relay LE. Contacts fe1 and fe2 of relay FE constitute a first transfer switching means for transfer connecting a pair of speech lines to the office speech line EX PH and the intercom speech line IT PH, whereas the contacts i1 and i2 of relay I constitute second transfer switching means for transfer connecting the speech line to a call signal generator to be described later and to the first transfer switching means. The relay LE constitutes a loop supervisory means for supervising the loop of the speech line.

Still referring to FIG. 3, the output terminals of a call signal generator RGO are connected across the primary winding P of a transformer T2 via transistors Q1 and Q3 of a Darlington connection. BTG designates a busy tone signal generator, and its output terminal is connected to the contact bu of relay BU through serially connected resistor R13 and capacitor C6.

Still referring to FIG. 3, PC designates a photocoupler made up of a luminous element Pd and a light receiving element Pt. This photocoupler PC is connected in a DC loop utilized for sending out a call signal when the standard telephone set TEL5 is called by the control circuit RSC. The anode electrode of the luminous element Pd is connected to a $+24$ V source terminal through a resistor R3, while the cathode electrode is connected to the contact bu of relay BU via a diode D1. The collector electrode of the light receiving element Pt is connected to the base electrode of a transistor Q5 via a resistor R4. The transistor Q3 is connected between $+24$ V terminal and the ground through serially connected resistors R5 and R6. The emitter electrode of the light receiving element Pt is connected to the base electrode thereof through a resistor R7 and also is connected to the ground SG. The emitter electrode of transistor Q6 is connected to the $+24$ V terminal and its collector electrode is connected to the mid tap of the primary winding P of a transformer T2 via a resistor R8, while the base electrode is connected to the junction between resistors R5 and R6. These elements constitute the call signal generator.

A capacitor C1 is connected in parallel with the secondary winding S of transformer T2. One end of the secondary winding S is grounded at SG, and the other end is connected to the contact bu of relay BU via capacitor C2.

One end of relays FE, I and BU are commonly connected to the +24 V source terminal. The other end of relay FE is connected to a relay drive circuit RDC, and the other ends of relays I and BU are gounded respectively through transistors Q7 and Q8. The base electrodes of transistors Q7 and Q8 are connected to ports 6 and 7 of a decoder TB2 respectively through resistors R9 and R10. The other ends of the decoders TB2, TB1 and TB3 are connected to the control circuit CPU of the microprocessor MP.

One end of the contact le of relay LE in terminal unit TU5 is connected to an input port $\overline{K2}$ of the control circuit CPU, while the other end is connected to the output port $\overline{R4}$ of the control circuit CPU through serially connected diode D2 and inverter INV. The junction between the inverter INV and diode D2 is connected to the input port $\overline{R11}$ of the control circuit CPU via a diode D3 while the input side of inverter INV is grounded through a resistor R11. As above described, the main control device KSU is constituted by a call signal generator RGO, first transfer switching means including contacts fe1 and fe2 of relay FE which transfer connects a pair of speech lines to the office line speech lines or the intercom speech lines, second transfer switching means constituted by contacts i1 and i2 of relay I which transfer connects speech lines to the call signal generator RGO or to the first switching means, a loop supervisory means including relay LE which supervises the loop of the speech line, and a control circuit CPU inputted with the output of the supervisory means that is the output of the relay contact le for controlling the first transfer switching means and the second transfer switching means in accordance with the states of the office lines and the key telephone sets.

Portions bounded by dot and dash lines, that is terminals (1), (2), (3), (5) and (6) in the terminal unit TU5, are terminals only for two wire telephone units. The terminals not included in parentheses, that is terminals 1, 2, . . . 7, 9, 13, 14, 15 and 16, are common to four wire telephone units.

The embodiment shown in FIG. 3 operates as follows.

At the time of an intercom call signal arrival at the two line standard telephone set TEL5, the control circuit CPU sends out a signal IDV of "H" from the port 6 of the decoder TB2 to operate relay I. Accordingly, the OFF hook signal detection circuit established at the time of sending a call signal from the standard telephone set TEL5 when its handset is OFF hooked is constituted by the following circuit:

+24 V source-resistor R3-luminous element Pd of the photocoupler PC-diode D1-relay contact bu-relay contact i1

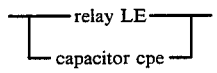

standard telephone TEL5-relay contact i2-ground SG, whereby the OFF hook signal is detected by the photocoupler PC.

The call signal is sent out by sending out a signal RSTN from the output port 06 of the control circuit CPU through a port O of the decoder TB3. When this signal RSTN becomes a "H" level, transistor Q5 is turned ON with the result that also transistor Q6 is turned ON to apply +24 V to the mid tap of the primary winding P of transformer T2. Under these conditions, the output of the call signal generator RGO is applied to the base electrodes of transistors Q1 and Q3 thus turning them ON. When transistors Q1 and Q3 are turned ON, transistors Q2 and Q4 also are turned ON so that both ends of primary winding P of transformer T2 are alternately grounded. As a consequence, a stepped up voltage appears across the secondary winding S of transformer T2 which produces a call signal. The call signal is sent to the two wire standard telephone set TEL5 through a path including ground SG-secondary winding S of transformer T2, capacitor C2-relay contact bu-relay contact i1-capacitor Cpe-standard telephone set TEL5-relay contact i2-and ground.

When the hand set of the standard telephone set TEL5 is hooked OFF, the OFF hook signal detection circuit described above is closed to pass DC current so that the photocoupler PC is turned ON with the result that transistor Q5 and Q6 are turned OFF whereby the power supply to transistors Q2 and Q4 through the primary winding P of the transformer T2 is interrupted, thereby stopping the call signal.

As above described the photocoupler PC is included in the DC loop established at the time of sending out the call signal so that the detected output of the photocoupler stops the operation of the call signal generator RGO before the stopping operation caused by the loop supervisory relay LE.

When the two wire standard telephones set TEL5 is hooked OFF, relay LE operates to send an OFF hook signal to the control circuit CPU from its contact le. When the output port $\overline{R4}$ of the control circuit CPU sends out a "L" signal for scanning, the signal DBO applied to the terminal 14 of the terminal unit TU5 becomes "H", and the output of inverter INV becomes "L". Thus, when relay contact le is closed the loop signal LOOP supplied to the input port K2 of the control circuit CPU becomes "L" through diode D2, detecting the operation of relay LE.

The loop signal LOOP from the relay contact le is the detection signal of the DC loop and acts as an active signal of "L" given to the input port $\overline{K2}$ of the control circuit CPU. A signal DBO sent out from the output port R4 of the control circuit CPU is a signal for selecting or scanning an input signal and becomes an active signal of "L" at the output port $\overline{R4}$ of the control circuit CPU.

A signal RMD sent out through terminal (6) of diode D3 acting as a discriminator of a substrate to be added of the terminal unit TU5 is an input signal that discriminates whether the add terminal unit is a connection for a four wire key telephone set or a connection for a two wire standard telephone set. Where a two wire standard telephone set is actually installed, when scanned with signal DBO the output of inverter INV becomes "L" so as to apply a signal of "L" to the input port $\overline{R11}$ of the control circuit CPU. In the case of a substrate for adding a four wire key telephone set, since diode D3 is not connected to terminal (6) a signal of "L" would not be applied to the input port $\overline{R11}$ of the control circuit CPU.

As above described, by mounting an additional substrate with a key telephone interface circuit on the substrate of the main control device KSU it is possible to add another key telephone set connected by a pair of speech lines and a pair of signal lines. An additional substrate prepared and mounted with the standard telephone set interface circuit connected to the same terminal position for the same input/output line as the key telephone set interface circuit, but connected to an individual terminal position for an exclusive input/output line. By mounting the additional substrate with the standard telephone set interface circuit on the substrate with the key telephone set interface circuit so as to judge the substrate identification signal DBO, it becomes possible to add a standard telephone set connectable with only one pair of speech lines. Since the loop supervisory signal LOOP is a periodic signal it is possible to identify the substrate whenever desired.

It is possible to identify the type of additional substrate by branching the loop supervisory signal LOOP that periodically supervises the state of the contact le of the loop supervisory relay LE on only one additional substrate and by detecting the presence or absence of return of the branched loop supervisory signal LOOP.

When the control circuit CPU detects that the handset of the two wire standard telephone set TEL5 has been hooked OFF, the control circuit CPU makes the following designation depending upon whether the arrived call signal is sent from the intercom lines or from the office lines.

In the case of arrival of the call signal from intercom lines, the port 4 or the decoder TB1 remains at the "H" level so that relay FE continues its normal operating state. Thus the contacts fe1 and fe2 are in dotted line positions. Since a signal IDV becomes "L" at the port 6 of the decoder TB2, relay I is reset. Consequently, the two wire standard telephone set TEL5 is connected to the intercom speech circuit IT PH via capacitors C4 and C5 and a DC current is supplied to the two wire standard telephone set TEL5 through a circuit including +24 V source-resistor R1-transformer T1-relay contact fe1-relay contact i1-relay LE-standard telephone set TEL5-relay contact i2-relay contact fe2-transformer T1-resistor R2- and ground SG.

In a case wherein an office line call signal arrives, the port 4 of the decoder TB1 becomes "L" so that relay FE resets. Relay I also resets as above described so that the two wire standard telephone set TEL5 would be connected to the office line speech circuit EX PH.

When a hand set is hooked ON after completion of a call, relay LE resets and the closure of its contact le is detected by the output port $\overline{R4}$ and the input port $\overline{K2}$ of the control circuit CPU, whereby all elements return to their original state.

The origination operation will now be described.

When the handset of the two wire standard telephone set TEL5 is hooked OFF, a loop current flows through a path including +24 V source-resistor R1-transformer T1-relay contact fe1-relay contact i1-

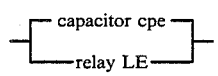

relay contact fe2-transformer T1-resistor R2-ground SG.

As a consequence the two wire standard telephone set TEL5 is connected to the intercom speech circuit IT PH through capacitors C4 and C5. Further, relay LE operates to send an ON hook signal to the control circuit CPU through its contact le.

Under this state, when the four wire terminal key telephone sets are simultaneously called from the two wire standard telephone set TEL5, and the called party replies, speech can be transmitted.

Where a intercom line control circuit ICB is provided as in this embodiment, station telephone sets can be individually called by dialling. More particularly, since the intercom line control circuit ICB is provided, the variation in the voltage drop caused by resistor R2 in the loop circuit (due to dialling) is sent to the intercom line control circuit ICB, and this information is sent to the control circuit CPU. Where the number of the dial pulses are counted, tone signals caused by dialling are sent via the intercom speech circuit IT PH.

Where the office lines are to be arrested by the two wire standard telephone set TEL5, when the handset is hooked OFF to supply the loop current, relay LE is reset for 200-1000 msec. by hooking ON the two wire standard telephone set so as to send the hooking information to the control circuit CPU from the relay contact le. Consequently, the control circuit CPU resets the relay FE to connect the two wire standard telephone set TEL5 to the office lines.

Where the intercom line control circuit IBC is provided, connection to the office lines is also possible by dialing 7, for example, instead of hooking. At this time, where an other four wire key telephone set is using the office lines the control circuit CPU operates relays I and BU for sending a busy tone to the two wire standard telephone set TEL5 from the busy tone generator BTG.

When the relay BU operates a direct current is supplied through a circuit including +24 V source-resistor R12-relay contact bu-relay contact i1-relay LE-standard telephone set TEL5-relay contact i2-ground SG.

The busy tone is given to the standard telephone set TEL5 from the busy tone signal generator BTG via resistor R12 and capacitor C6.

Upon hearing the busy tone the user of the two wire standard telephone set TEL5 hooks ON its handset and all elements return to their initial state.

As above described under the normal state a pair of speech lines are connected to the intercom speech lines via first transfer switching means including the contacts fe1 and fe2 of relay FE which transfer connects the speech lines between the office speech lines and the intercom speech lines, and second transfer switching means including the contacts i1 and i2 of relay I which transfer connects the pair of speech lines between the call signal generator RGO and the first switching means. When the office line call signal arrives the second transfer switching means is switched to supply a call signal to the telephone set and then the second transfer switching means is reset by the output of a loop supervisory means comprising relay LE that supervises the loop of the speech lines. At the same time the first transfer switching means switched to the office line speech lines.

Figure 4:
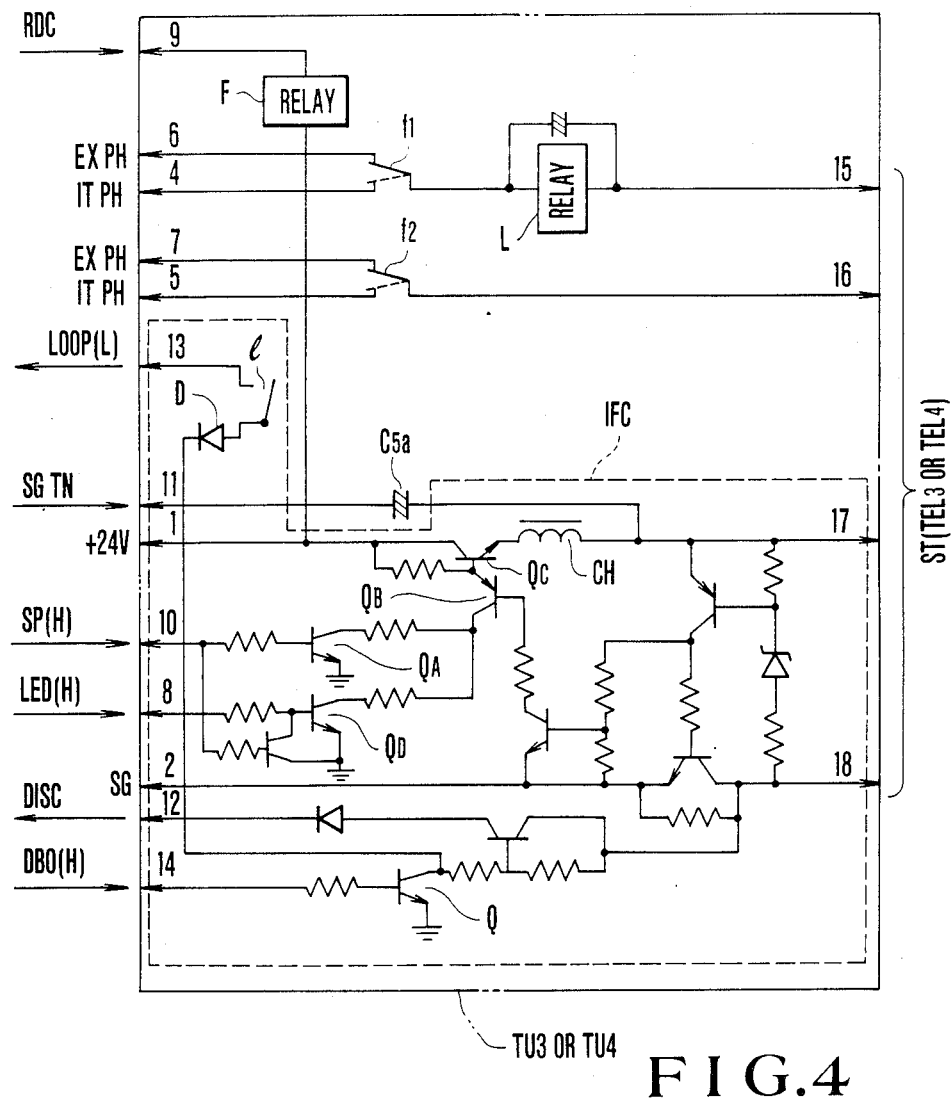
FIG. 4 shows the detail of the circuit of a terminal unit utilized in a four wire key telephone set mounted on a terminal addition substrate.

It is also possible to transfer the speech signals from another key telephone set. FIG. 4 shows the detail of the circuit of a terminal unit TU3 or TU4 utilized in a four wire key telephone set mounted on the additional substrate in the embodiment described above. When the substrate shown in FIG. 4 is used instead of the terminal unit shown in FIG. 3, this portion can also be used for a four wire key telephone set. In FIG. 4 F(corresponding to FA or FB of TU1 or TU2) designates a relay connected between a terminal 1 impressed with the +24 V source voltage and a terminal 9 connected to the relay drive circuit RDC shown in FIG. 1 or FIG. 3 for transfer switching a terminal unit between the office line speech circuit FX PH and the intercom speech circuit IT PH. The relay is provided with contacts f1 and f2 for transfer connecting between the office lines and the intercom lines. Normally these contacts are in the dotted line positions but are transfered to the solid line positions when the relay F is energized. A relay L is inserted in a speech circuit loop for supervising the loop. Thus relay L supervises the loop when a DC loop is formed through its contact f1 when a terminal telephone set is hooked OFF. The relay L has a loop supervisory contact. One end of the contact is connect to a terminal 13, while the other end is connected to the collector electrode of a transistor Q which is turned ON by a signal DBO outputted from an output port $\overline{R4}$ of the control circuit CPU shown in FIG. 3 and applied via a diode D. Consequently, this terminal unit gives a signal showing that relay L is energized to close its contact so that a DC loop is formed by the port $\overline{K2}$ of the control circuit CPU when a substrate identification signal is given or a scanning signal is given. Accordingly signal DBO has a substrate identification performance, ON/OFF supervisory performance of a relay and a control signal performance for deriving a voltage signal from the terminal DISC. The last mentioned control signal performance is not necessary for a two wire terminal unit. The normally closed contacts f1 and f2 of the relay F are connected to the office line speech circuit EX PH via terminals 6 and 7 respectively. When contacts F1 and F2 are open contacts are connected to the intercom speech circuit IT PH respectively through terminals 4 and 5. The terminal SP is supplied with a door signal, etc., when a signal for operating the amplifier of the control circuit of a telephone set effects simultaneous voice communications, individual voice or signal communications, office line incoming calls or an alarm. The voltages applied to the terminal SP and LED may be different.

Terminals 8, 10 to 12, 17 and 18 of the four wire key telephone set are exclusively used for the key telephone set, while terminals 1, 2, 4 to 7, 9, 14, 15 and 16 are commonly used with the two wire standard telephone set.

When making simultaneous calls, an ordinary individual call or an alarm control signal is applied to terminal 10 from the control circuit CPU via a decoder TB2 to turn ON transistor QC via transistor QA and QB so as to give a telephone set TEL a varying voltage via terminal 17. For example, a normal voltage of 22 V is varied to 14 V. The telephone set TEL detects this voltage variation to operate its loudspeaker SP. Then the output of the amplifier AMP is sent to the loudspeaker SP of the telephone set TEL via terminal 11 and capacitor C5a to operate the loudspeaker SP as shown in FIG. 2 and FIG. 4.

When an office line call signal arrives during the use of the office lines the call signal causes the voltage applied to the telephone set to vary through the control circuit CPU, the port R5 of the decoder TB2 shown in FIG. 3, terminal LED and transistors QD, QB and QC. The voltage changes by 18 V, for example. As a consequence, this voltage change is applied to the telephone set TEL and LED1 via terminal 17 to cause the LED to flicker or light. From terminal 12 is derived out the voltage of terminal 18 which is supplied to the control voltage detector CVD (see FIG. 1) as a control signal DISC. When the contacts f1 and f2 of relay F are at the dotted line positions, the terminal unit is connected to the intercom speech circuit IT PH. When these contacts are at the solid line positions the terminal unit is connected to the office line speech circuit EX PH. Upon energization of the relay F its contacts f1 and f2 are thrown to the dotted line positions. For example, the key telephone set TEL3 is hooked OFF and a line key LO2 is depressed for sending a call signal. The relay F is reset and its contacts f1 and f2 are thrown to the solid line positions to connect the key telephone set TEL3 to the office line speech circuit EX PH. When the key telephone set TEL3 is hooked ON or reserved the relay F throws its contacts f1 and f2 back to the dotted line positions.

As above described, according to this invention a standard telephone set can provide the minimum necessary performances of office line origination and paging (transmission and receival of an office line call signal) and intercom line origination and paging.

Furthermore, according to this invention the telephone control unit in the main control divice KSU allows a key telephone set with four wire control keys to be replaced with a two wire standard telephone set so that the same intercom line can be used for a four wire telephone set and a two wire telephone set. This is advantageous for decreasig the space necessary for installation. Moreover, as it is not necessary to provide inside and external exclusive control circuits as in the two remote wire telephone set, the construction can be simplified and the cost of installation can be reduced.

Moreover, according to this invention occupation of the intercom speech line caused by ON/OFF operations of a handset of a two wire telephone set located at a remote position can be prevented so that other station telephone set can freely use the intercom speech circuit.

As above described, according to this invention a loop supervisory signal that periodically supervises the states of the contact of a loop supervisory relay is branched on only one additional substrate. The type of the added substrate is identified by detecting presence or absence of the sending back of the branched loop supervisory signal. Thus, it is not only possible to prevent an increase in the number of components but it also is possible to prevent erroneous identification of the added substrate. Furthermore, it is possible to decrease the control operations for identification signals and eliminate identification signal lines which are exclusively used for identification.

What is claimed is:

1. In a key telephone system with a plurality of four-wire key telephone sets wherein a two-wire telephone set is connected to a main control device via a pair of speech lines so that intercom speech and office line speech are possible between the two-wire telephone set and other key telephone sets, the improvement wherein said main control device comprises a call signal generating circuit, first transfer switching means for transfer-connecting said speech lines between a pair of office speech lines and a pair of intercom speech lines, second transfer switching means for transfer-connecting said speech lines between said call signal generating circuit and said first transfer switching means, DC loop supervisory means for supervising a DC loop of said speech lines, and a control circuit inputted with an output of said DC loop supervisory means for controlling said first and second transfer switching means in accordance with the states of said office lines, whereby, under a normal state, said speech lines are connected to said intercom speech lines through said first and second transfer switching means, at the time of arrival of an office line call signal said second transfer switching means is switched to send said call signal to said speech lines, thereafter said second transfer switching means is reset and said first transfer switching means is switched to the side of said office speech lines in accordance with the output of said loop supervisory means, which further comprises a substrate with a plurality of input terminals for an additional two-wire telephone set, said substrate having mounted thereon circuit elements other than said control circuit, one group of said terminals being connected to said control circuit, another group thereof being connected to said two-wire telephone set, and a remaining group also thereof being connected to said office speech lines and intercom speech lines, which still further comprises a substrate with a plurality of input and output terminals for an additional four-wire key telephone set and a signal transmitting and receiving circuit for transmitting control signals to said additional four-wire telephone set and receiving key control signals therefrom, said substrate having mounted thereon circuit elements other than said control circuit, one group of said terminals being connected to said control circuit, another group thereof being connected to said four-wire telephone set, a remaining group also thereof being connected to said office speech lines and intercom speech lines, said terminals of said substrate corresponding to said terminals of said substrate of said additional two-wire telephone set, and which further comprises means for judging whether the added substrate is of the two-wire type or four-wire type according to absence or presence of a sent back identification signal.

2. A key telephone system according to claim 1 wherein said DC loop supervisory means comprises a DC loop supervisory relay arranged on said speech lines.

3. A key telephone system according to claim 1 which further comprises means responsive to hooking off of a handset of said two-wire telephone set for simultaneously sending a call signal to all key telephone sets.

4. A key telephone system according to claim 1 wherein said control circuit performs an individual calling operation to one of said four-wire key telephone sets and an arresting operation of office lines in accordance with dialling said two-wire telephone set.

5. A key telephone system according to claim 1 wherein said control circuit arrests said office lines according to the hooking operation of a handset.

6. A key telephone system according to claim 1 which further comprises means for sending out a busy tone through said second transfer switching means and relay contact when said office lines are busy.

7. A key telephone system according to claim 1 which further comprises a photocoupler connected in a DC loop formed at the time of sending a call signal and means for stopping sending out of said call signal by an output of said photocoupler.

8. A key telephone system according to claim 1 wherein said first transfer switch means is constituted by a normally operative first relay and said second transfer switching means is constituted by a second relay.

9. A key telephone system according to claim 1 wherein said control circuit is constituted by a microprocessor.

10. A key telephone system according to claim 1 wherein said control circuit periodically supervises contacts of a supervisory relay for detecting an OFF hook state.

11. In a key telephone system with a plurality of four-wire telephone sets wherein a two-wire telephone set is connected to a main control device via a pair of speech lines so that intercom speech and office line speech are possible between the two-wire telephone set and other key telephone sets, the improvement wherein said main control device comprises a call signal generating circuit, first transfer switching means for transfer-connecting said speech lines between a pair of office speech lines and a pair of intercom speech lines, second transfer switching means for transfer-connecting said speech lines between said call signal generating circuit and said first transfer switching means, DC loop supervisory means for supervising a DC loop of said speech lines, and a control circuit inputted with an output of said DC loop supervisory means for controlling said first and second transfer switching means in accordance with the states of said office lines, whereby, under a normal state, said speech lines are connected to said intercom speech lines through said first and second transfer switching means, at the time of arrival of an office line call signal said second transfer switching means is switched to send said call signal to said speech lines, thereafter said second transfer switching means is reset and said first transfer switchng means is switched to the side of said office speech lines in accordance with the output of said loop supervisory means, which further comprises a substrate with a plurality of input terminals for an additional two-wire telephone set, said substrate having mounted thereon circuit elements other than said control circuit, one group of said terminals being connected to said control circuit, another group thereof being connected to said two-wire telephone set, and a remaining group also thereof being connected to said office speech lines and intercom speech lines, which still further comprises a substrate with a plurality of input and output terminals for an additional four-wire key telephone set and a signal transmitting and receiving circuit for transmitting control signals to said additional four-wire key telephone set and receiving key control signals therefrom, said substrate having mounted thereon circuit elements other than said control circuit, one group of said terminals being connected to said control circuit, another group thereof being connected to said four-wire telephone set, a remaining group also thereof being connected to said office speech lines and intercom speech lines, said terminals of said substrate corresponding to said terminals of said substrate of said additional two-wire telephone set, wherein said DC loop supervisory means comprises a loop supervisory relay having contacts arranged on said speech lines, said control circuit sending out a periodic speech line loop supervisory signal to said contacts of said loop superviosry relay on said contacts of said loop supervisory relay on said additional substrates, and which further comprises means for branching an identification signal from said loop supervisory signal and means for judging the type of added substrate according to absence or presence of a sent back identification signal.

12. In a key telephone system with a plurality of four-wire key telephone sets wherein a two-wire telephone set is connected to a main control device via a pair of speech lines so that intercom speech and office line speech are possible between the two-wire telephone set and other key telephone sets, the improvement wherein said main control device comprises a call signal generating circuit, first transfer switching means for transfer-connecting said speech lines between a pair of office speech lines and a pair of intercom speech lines, second transfer switching means for transfer-connecting said speech lines between said call signal generating circuit and said first transfer switching means, DC loop supervisory means for supervising a DC loop of said speech lines, and a control circuit inputted with an output of said DC loop supervisory means for controlling said first and second transfer switching means in accordance with the states of said office lines, whereby, under a normal state, said speech lines are connected to said intercom speech lines through said first and second transfer switching means, at the time of arrival of an office line call signal said second transfer switching means is switched to send said call signal to said speech lines, thereafter said second transfer switching means is reset and said first transfer switching means is switched to the side of said office speech lines in accordance with the output of said loop supervisory means, which further comprises means responsive to hooking off of a handset of said two-wire telephone set for simultaneously sending a call signal to all key telephone sets.

13. In a key telephone system with a plurality of four-wire key telephone sets wherein a two-wire telephone set is connected to a main control device via a pair of speech lines so that intercom speech and office line speech are possible between the two-wire telephone set and other key telephone sets, the improvement wherein said main control device comprises a call signal generating circuit, first transfer switching means for transfer-connecting said speech lines between a pair of office speech lines and a pair of intercom speech lines, second transfer switching means for transfer-connecting said speech lines between said call signal generating circuit and said first transfer switching means, DC loop supervisory means for supervising a DC loop of said speech lines, and a control circuit inputted with an output of said DC loop supervisory means for controlling said first and second transfer switching means in accordance with the states of said office lines, whereby, under a normal state, said speech lines are connected to said intercom speech lines through said first and second transfer switching means, at the time of arrival of an office line call signal said second transfer switching means is switched to send said call signal to said speech lines, thereafter said second transfer switching means is reset and said first transfer switching means is switched to the side of said office speech lines in accordance with the output of said loop supervisory means, which further comprises a photocoupler connected in a DC loop formed at the time of sending a call signal and means for stopping sending out of said call signal by an output of said photocoupler.

14. A key telephone system comprising:
a two-wire telephone set;
a four-wire telephone set; and
a main control device for selectively connecting said telephone sets to either a pair of intercom speech lines or a pair of office lines,
said main control device including:
a first transfer switching means for normally connecting said two-wire telephone set to said pair of intercom speech lines;
a busy tone generator for generating a busy tone;
a second transfer switching means arranged between said first transfer switching means and said two-wire telephone set, which normally connects said first transfer switching means to said two-wire telephone set; and
a control means for controlling said first and second transfer switching means,
said second transfer switching means being controlled by said control means so that said second transfer switching means disconnects said two-wire telephone set from said first transfer switching means and then connects said two-wire telephone set to said busy tone generator when a request from said two-wire telephone set hooked OFF is not accepted and when a request from said two-wire telephone set is not made for a definite interval.

* * * * *

UNITED STATES PATENT AND TRADEMARK OFFICE
CERTIFICATE OF CORRECTION

PATENT NO. : 4,572,928
DATED : 2/25/86
INVENTOR(S) : Nishimura et al.

It is certified that error appears in the above-identified patent and that said Letters Patent is hereby corrected as shown below:

| COLUMN | LINE | DESCRIPTION |
|--------|------|-------------|
| 04 | 15 | delete "h" insert --h-- |

Signed and Sealed this

Eleventh Day of October, 1988

*Attest:*

DONALD J. QUIGG

*Attesting Officer*    *Commissioner of Patents and Trademarks*